May 22, 1945.  E. C. BURDICK  2,376,572
CONTROL INSTRUMENT
Filed May 25, 1943  3 Sheets-Sheet 1
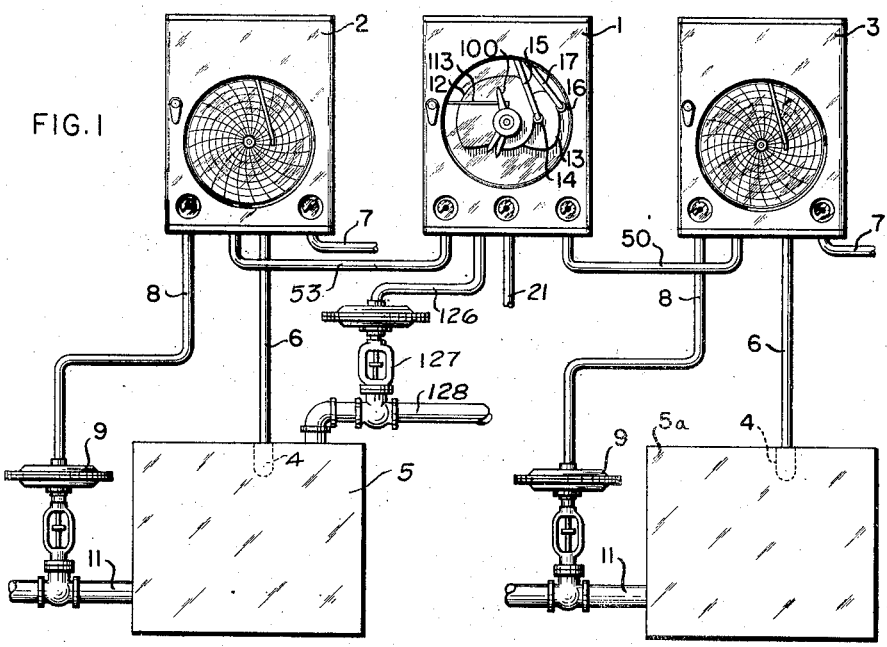
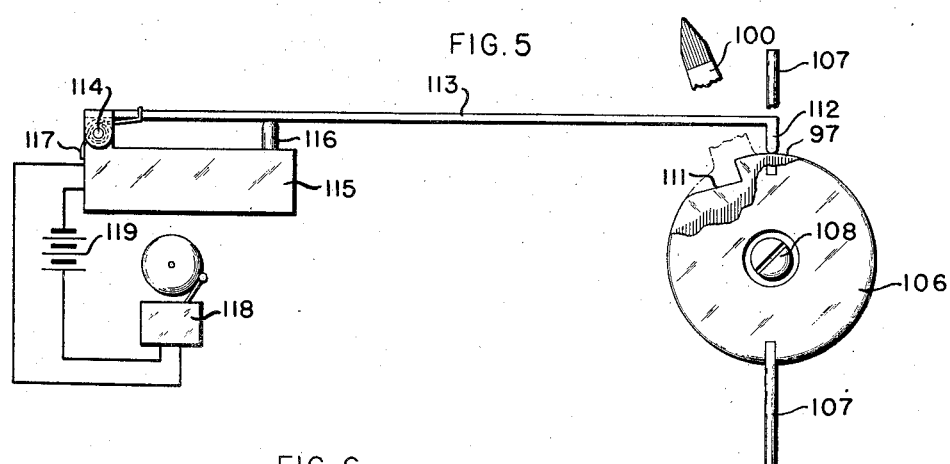
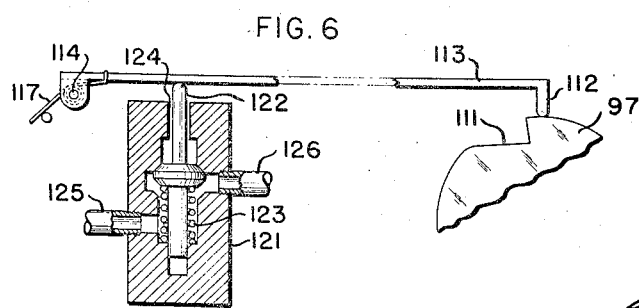
INVENTOR.
EDWIN C. BURDICK
BY
*E. B. Spangenberg*
ATTORNEY.

May 22, 1945.　　　E. C. BURDICK　　　2,376,572
CONTROL INSTRUMENT
Filed May 25, 1943　　　3 Sheets-Sheet 2

INVENTOR.
EDWIN C. BURDICK
BY
ATTORNEY.

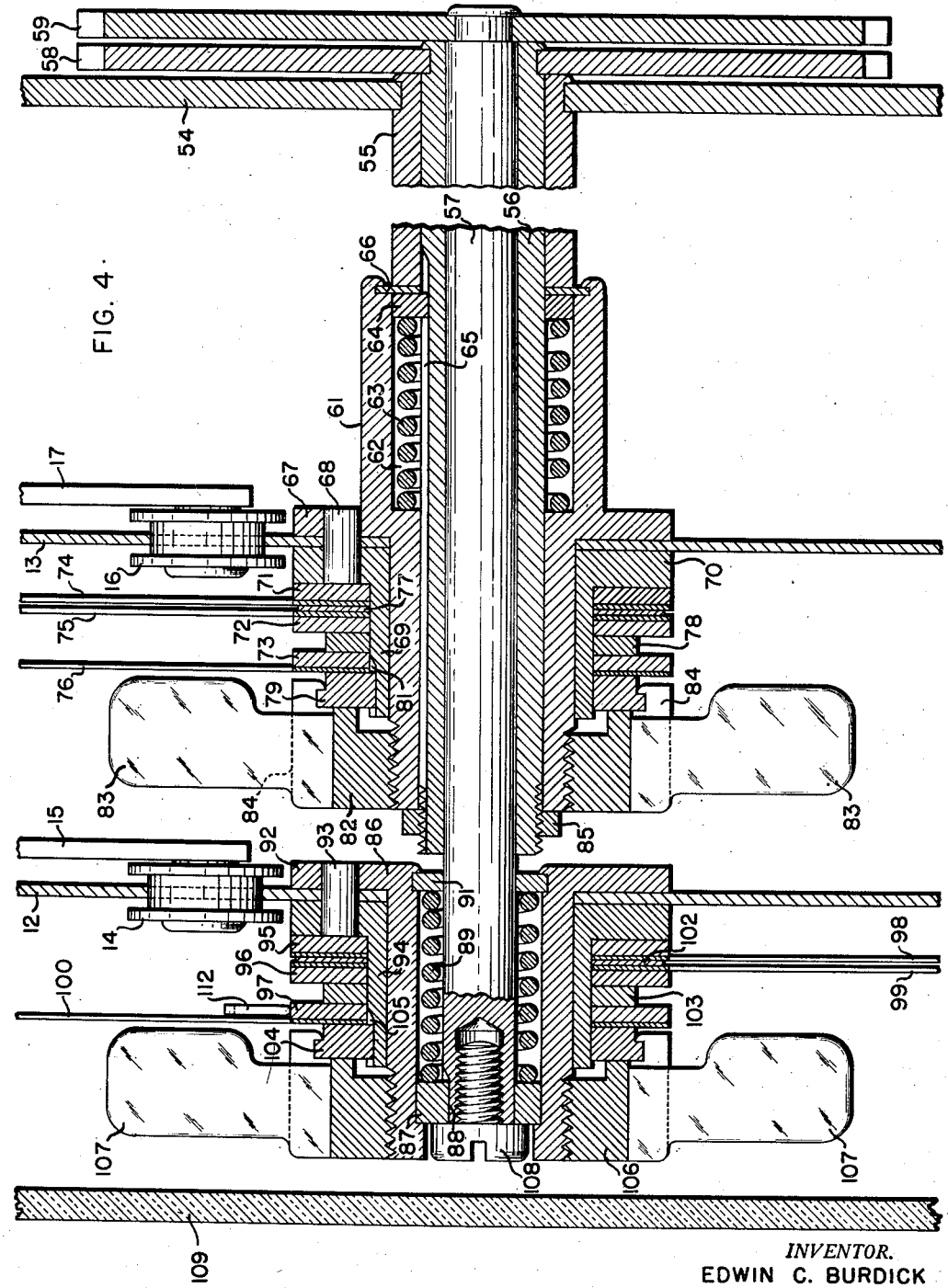

Patented May 22, 1945

2,376,572

UNITED STATES PATENT OFFICE 2,376,572

CONTROL INSTRUMENT

Edwin C. Burdick, Philadelphia, Pa., assignor to The Brown Instrument Company, Philadelphia, Pa., a corporation of Pennsylvania Application May 25, 1943, Serial No. 488,383

10 Claims. (Cl. 74—568)

The present invention relates to automatic control systems, and more particularly to a control system in which a time cycle device is used to adjust a variable condition such as temperature, pressure, liquid level, or the like, in accordance with a predetermined schedule.

It has been proposed to secure a time-condition schedule by using a cam shaped in accordance with this schedule to set up an air pressure. This air pressure is used to adjust the control point of a control instrument that is responsive to the condition that is to be controlled. Such a system is disclosed in the application of Neel I. Cockley, Serial No. 419,011, filed on November 13, 1941. The present invention is directed to a similar system in which provision is made to support a plurality of cams in a single instrument.

It is an object of the invention to provide an instrument which is adapted to set up a plurality of control pressures in response to the shape of a plurality of characterized cams. It is a further object of the invention to provide a means for securing a plurality of cams in an instrument in such a manner that they may be individually adjusted and that certain of the cams may be removed as a unit. It is a further object of the invention to provide a mechanism in which a plurality of auxiliary cams may be used in connection with each of the characterized cams. These auxiliary cams may be individually adjusted and may be used to adjust or control various auxiliary apparatus that is used in connection with the control system.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings—

Figure 1 is a view of a control system,

Figure 4 is a sectional view of the cam supporting means, Figure 5 is a view showing one manner in which the auxiliary cams may be used, and Figure 6 is a view showing another manner for using the auxiliary cams.

Figure 2:
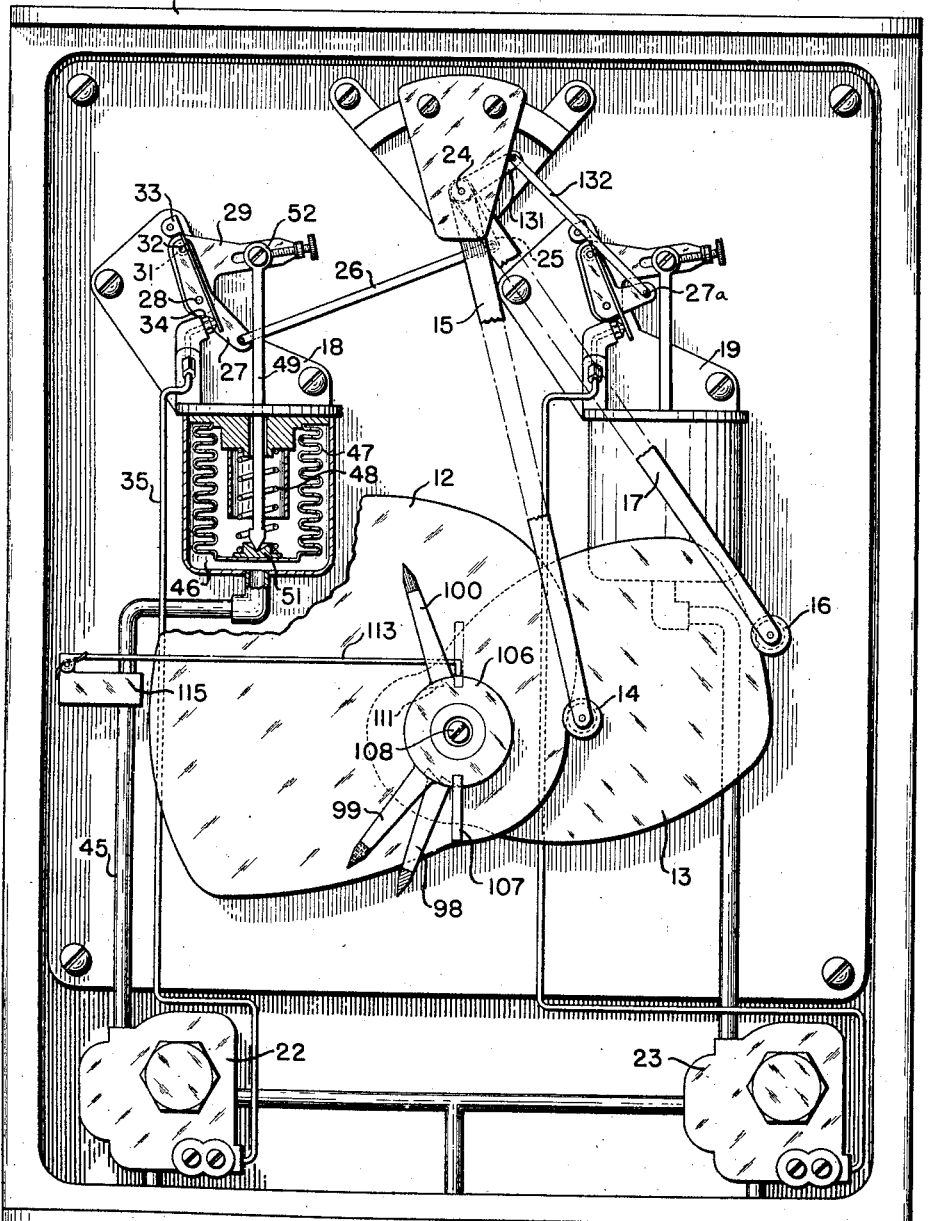
Figure 2 is a front view, partly in section, of the pneumatic transmitting instrument.

Referring first to Figure 1, there is shown at 1 a controller embodying the invention which is used to supply air under varying pressure to adjust the control points of control instruments 2 and 3. Each of these instruments, which are shown by way of example herein as being temperature controllers, is provided with a thermometric system having a thermometer bulb 4 that is located in heater 5 or 5a, respectively, which bulbs are connected by means of capillary tubes 6 to the instruments 2 and 3 respectively. Each of these instruments is supplied with air at a suitably constant pressure through pipe 7, and serves to regulate this air in accordance with the value of the temperature and the control point adjustment of the instrument and to supply this regulated air through a pipe 8 which is connected at its other end to an air control valve 9. The valves 9 are located in pipes 11 which supply a temperature changing medium to the heaters. The instruments 2 and 3 may take the form of the instrument shown in Moore Patent 2,216,448 in which patent there is shown an instrument that can control some variable condition and which instrument has its control point adjusted by a pneumatic means.

Figure 3:
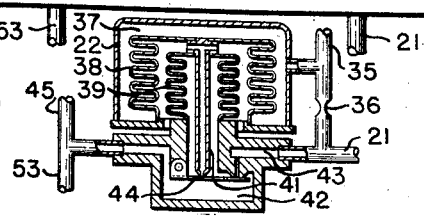
Figure 3 is a sectional view of a pilot valve.

It will be seen in Figure 2 that the instrument 1 has in it a pair of characterized cams 12 and 13 that are shaped to give a predetermined time-condition schedule. The cams are driven at a constant speed, which may be different for each cam, and are so shaped that their radii vary in accordance with the temperature it is desired to maintain at any particular time. The cam 12 has bearing on it a roller 14 on the lower end of a cam follower arm 15, and the cam 13 has bearing on it a roller 16 on the lower end of a cam follower arm 17. As these arms move due to a change in radius of the respective cams they operate pressure transmitters 18 and 19 respectively to set up an air pressure which is proportional to the position of the arm. These transmitters are identical and a detailed description of the mechanism and operation of one will suffice. Air is supplied from a suitably constant source, which may well be the same source which supplies pipes 7, to the instrument 1 through the pipe 21 which divides to supply pilot valves 22 and 23 that are used in conjunction with the transmitters 18 and 19 respectively. The details of these pilot valves are shown in Figure 3.

As the cam follower arm 15 is moved around its pivot 24 it acts through an arm 25 and a link 26 to move a flapper operating lever 27 around its pivot 28. This pivot is on one arm of a bell crank lever 29 that is pivoted at 31. The lever 27 has a pin 32 on its upper end which pin serves to move a flapper 33 relative to a bleed nozzle 34 that is supplied with air through a nozzle pipe 35. The pipe is in turn supplied with air from the pipe 21 through a restriction 36 and is also connected with an expansible chamber 37 in the pilot valve 22. The chamber 37 has one of its walls formed of a bellows 38 that is connected to a second and smaller bellows 39; the bellows jointly carrying an exhaust nozzle 41 that extends into a second pilot valve chamber 42. This chamber also has in it a supply nozzle 43 and a valve 44 which serves to close both of the nozzles 41 and 43. The valve 44 is biased in a nozzle closing direction by means of a suitable spring. Chamber 42 is connected by means of a pipe 45 with an expansible chamber 46 in the transmitter mechanism 18. The latter chamber has one wall formed by means of a bellows 47 which acts against a spring 48. As the bellows varies in length due to pressure changes in the chamber 46 a bellows rod 9, whose lower end bears against a socket 51 on the bellows end wall, acts through a connection 52 to move the bell crank lever 29 around its pivot 31 to shift the position of pivot pin 28.

In the operation of this transmitter, as the cam follower arm 15 is moved into a counter-clockwise direction, for example, the lever 27 is also moved in this direction so that pin 32 will permit the flapper 33 to move forward and throttle the flow of air through the nozzle 34. This produces an increase in nozzle pressure and an increase in the pressure of chamber 37 so that bellows 38 and 39 will collapse. Such action will move the nozzle 41 downwardly so that it may move the valve 44 away from the nozzle 43 thus permitting an increase in pressure in the chamber 42 the pipe 45 and the chamber 46. The pressure increase collapses the bellows 47 so that its end wall will move rod 49 upwardly, thereby moving bell crank 29 in a counter-clockwise direction. This causes the pivot 28 of the lever 27 to move in a direction so that a follow-up movement is given to the flapper 33.

The air pressure which is applied to the chamber 46 is also applied through a pipe 53 to the control point adjusting mechanism of the instrument 2. For a clockwise movement of the cam follower 15, the pressure changes that are produced would be in the opposite direction. The transmitter 19 works in exactly the same manner as the transmitter 18 and serves to apply its variable air pressures through a pipe 50 to the control point adjusting mechanism of the instrument 3. This transmitter is operated by the cam follower 17 through an arm 131 and a link 132 that is connected to a lever 27a which corresponds to the lever 27 in the transmitter 18.

The cams 12 and 13 are attached with other auxiliary cams to drive shafts as is shown in Figure 4. There is shown in that figure at 54 an instrument supporting plate which has a tubular bearing 55 rigidly attached to the same. Journaled in the bearing is a tubular shaft 56 for the cam 13 and journaled in this tubular shaft is a solid shaft 57 for supporting the cam 12 and its appurtenances. The shafts 56 and 57 are driven by gears 58 and 59, respectively, from some suitable timing mechanism at the same or at different speeds.

The assembly for the cam 13 is mounted on a tubular support 61 that is placed over the shaft 56. This support has an enlarged bore 62 which receives a spring 63 that bears with one end against the end of the enlarged portion of the bore, and at its other end against a washer 64 that is prevented from rotating relative to the shaft 56 by means of cooperation between this washer and a keyway 65 that is formed in the shaft. The washer is forced by the spring toward the right against a disc 66 that is attached, as shown, to the support 61. The arrangement being such that the support 61 may be rotated on the shaft 56 against the friction between washer 64 and disc 66 that is produced by the spring 63. Normally the friction between 64 and 66 is sufficient to rotate the support 61 with the shaft, but the support can be rotated manually against this friction.

The support 61 is provided with a flange 67 through which a pin 68 extends. This pin is adapted to receive an eccentric opening in the cam 13 when a concentric opening in the latter is received by the exterior of the support 61. The cam is held in place on the support by means of a tubular member 69 which has a flange 70 provided with an opening to receive pin 68. On the surface of this member there are mounted any desired number of annular auxiliary cams which are shown herein as being three in number and indicated by reference numerals 71, 72 and 73. Each is provided with a suitable pointer or index member 74, 75 and 76, respectively. The cams 71 and 72 are separated by means of a spacer 77, while the cams 72 and 73 are separated by means of a spacer 78. The auxiliary cams and their pointers are held in their adjusted positions on the member 69 by means of a collar 79 which has a portion that fits in a keyway 81 in the part 69. The collar is loosely attached to a nut 82 which is provided with wings 83 that are placed in slots 84 formed in the nut. After the auxiliary cams have been properly adjusted manually relative to the cam 13, the nut 82 is rotated in a direction to move the collar 79 toward the right to hold the auxiliary cams in place. The rotative movement of the nut will not operate to shift the auxilary cams because of the fact that the nut forces collar 79 to the right and this collar does not rotate. The entire assembly which is mounted on the support 61 is held in place on the shaft 56 by means of a small wing nut 85.

The assembly for the cam 12 is mounted on the shaft 57 and consists of a tubular supporting member 86 that receives in its bore a washer 87, provided with a key extending into a keyway 88 in the shaft 57, and a spring 89. The washer and the spring are held in place in the bore of the supporting member 86 by means of a disc 91 that is attached as shown to close the bore in support 86. In this case also, the supporting member may be rotated relative to the shaft 57 and is normally held in any given angular relation with respect to the shaft by means of friction between washer 87 and the overhanging end of the support 86, which friction is provided by means of the spring 89.

The support 86 has a flange 92 extending outwardly from the same, which flange has in it a pin 93. This pin is adapted to receive an eccentric opening in the cam 12 when a concentric opening of the latter is received by the support 86. The cam is held in place on the support by means of a tubular member 94 in a manner similar to the way in which cam 13 was held in place by the tubular member 69. There is also shown on the surface of the supporting member 94 three auxiliary cams 95, 96, and 97 which have pointers 98 and 99 and 100 respectively.

The cams 95 and 96 are separated by a spacing member 102, while the cams 96 and 97 are separated by a spacing member 103. The auxiliary cams are held on the member 94 and this member is held in position on the support 86 by means of a collar 104 which has a portion extending into a keyway 105 in the member 94. This collar is loosely attached to a nut 106 that is provided with wings 107. The operation of the collar and the nut in this case is exactly the same as it was in the case of collar 79 and nut 82. The assembly which is mounted on the supporting member 86 is held in position on the shaft 57 by means of a screw 108 which extends into the end of this shaft and whose head is larger than the shaft and engages the left edge of washer 87. There is also shown at 109 in Figure 4 the glass which would normally be placed in the door of the instrument in which these cams are located.

From the above description it may be seen that each of the cam assemblies may be rotated on its drive shaft so that the main cam 12 or 13 is properly positioned relative to the cam followers, but that these cams are normally driven with their respective shafts at a suitable rate of speed. The auxiliary cams may be individually adjusted on their supports 69 and 94, respectively, with respect to the cams 13 and 12 and they are then forced against each other so that they will be held in place. The mounting is so fashioned that rotating of the clamping means will not have any effect on the position of these auxiliary cams. It will also be noted that the entire assembly for the cam 12 may be removed from its shaft to give access to the assembly for the cam 13 without in any way disturbing the relation of the cam 12 and its auxiliary cams. When the cam 12 is replaced it will be in exactly the same position relative to the shaft 57 that it originally was, because of the keyway 88 in that shaft and the washer 87. The assembly for the cam 13 may also be removed from the instrument without disturbing the relation of the various elements thereof by merely removing the nut 85. It will be noted that the cam supports 61 and 86 are of the same diameter and that the members 69 and 94 are also of the same diameter so that cams which are made for this instrument may be used interchangeably with either the inner or the outer cam assembly.

While the disclosure herein shows the cams 12 and 13 adjusting control points of a pair of controllers which are connected to separate heaters, it will be obvious that they could be used to adjust the control point of instruments controlling the value of different variables in the same heater or process.

The auxiliary cams are used for working various signals and the like at predetermined points during the cycle of the main cam depending upon how they are adjusted relative thereto. One of these cams is shown as performing this service, by way of example, and the other cams may be used to perform similar services in a similar manner. Referring to Figure 5, it will be seen that cam 97 has a cut-out portion 111 formed therein which is directly behind center of pointer 100 so that the position of pointer 100 will indicate the position of the actuating portion of this cam relative to the main cam 13. Bearing on the cam 97 is a downwardly projecting portion 112 of a cam follower 113 that is pivoted at 114 to a switch 115 which is mounted in any suitable fashion in the instrument casing. The switch has an operating plunger 116 that is actuated upon downward movement of the follower 113. This movement will take place under the driving force of a spring 117 when the cut out portion of the cam 97 moves below the end 112 of the cam follower. As shown herein, the switch 115 is used to close a circuit between an alarm 118 and a battery 119 so that an attendent will be notified that a certain point in the process being controlled has been reached.

Another manner in which an auxiliary cam may be used is shown in Figure 6 in which figure the follower is used to actuate an air pilot valve 121. As shown the pilot valve comprises a plunger 122 that is forced upwardly into engagement with the cam follower by means of a spring 123 to close an exhaust opening 124 and to open a passage between supply pipe 125 and a pipe 126. When the cam 97 is rotated sufficiently to bring its cut-out portion 111 underneath the cam follower, this follower will be moved downwardly by the spring 117 to close the connection between pipes 125 and 126 and to open the pipe 126 to the atmosphere. As shown in Figure 1, pipe 126 is connected to supply air to the diaphragm chamber of a valve 127 that is located in a supply pipe 128. According to the manner in which the valve 127 is operated the application of air to this valve may be used to either open or close it so that at some predetermined time during the process, pipe 128 will be either opened or closed to start or stop the flow of some medium through this pipe to the heater 5. It will be obvious that each of the auxiliary cams may be used to operate identical or similar apparatus to that which has been disclosed, but only one cam operating means has been shown herein for the sake of clearness of the disclosure.

From the above description, it will be seen that I have provided a compact time cycle transmitting instrument in which a plurality of cams may be individually mounted and rotated so that more than one time condition process control may be obtained with the use of a single transmitting instrument. I have also provided a means in which a number of auxiliary cams may be used in connection with the main cam to obtain various operations during the time that the process is being controlled.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described this invention, what I claim as new and desire to secure by Letters Patent is:

1. In a control instrument, the combination of a plurality of individually rotatable concentric shafts, the inner shaft extending in front of the shaft receiving it, a support frictionally mounted on each shaft, a plurality of cams fixedly mounted on each support, and means to mount the support on said inner shaft in a manner so that it may be removed therefrom without disturbing the cams thereon, so that the cams on the said receiving shaft may be accessible.

2. In a control instrument, the combination of a plurality of individually rotatable concentric shafts, the inner shaft extending beyond the shaft receiving it, means to individually drive said shafts, a support frictionally mounted on each shaft, a plurality of cams mounted on each support, means to hold positively one cam on each support against rotation thereon while the remaining cams are rotated, means to keep said remaining cams against rotation on their respective supports, and means to demountably attach each support on its respective shaft.

3. In a control instrument, the combination of a shaft rotated at a constant speed, a support mounted on said shaft to be driven thereby, a first cam, means to mount said cam on said support in non-rotatable relation thereto, a sleeve to hold said first cam on said support, a second cam mounted for rotation on said sleeve, and means to simultaneously hold said sleeve on said support and hold said second cam in non-rotatable position on said sleeve.

4. In a control instrument a main cam and an auxiliary cam, a support, means to mount said main cam on said support in a fixed position relative thereto, means to mount said auxiliary cam on said support for adjustment relative to said main cam, means to hold said cams on said support and against movement relative to each other, operating means extending between said main cam and a first mechanism and other operating means extending between said auxiliary cam and a second mechanism.

5. In a control instrument, a drive shaft, a washer keyed to said shaft, a support mounted on said shaft and having an enlarged bore that receives said washer, an abutment on said support against which said washer bears, a spring also received in said bore and bearing against said support and washer to produce a frictional drive between the two, a cam mounted in fixed relation on said support, a cam adjustable on said support, and means to hold said cams in fixed relation to each other on said support.

6. In a pneumatic transmission instrument, a plurality of operating arms, a rotatable cam to move each operating arm, a plurality of concentric shafts, the inner shaft extending beyond the shaft receiving it, supporting means for said cams individually mounted on said shafts, a frictional drive connection between each supporting means and its shaft, and auxiliary cams mounted on each supporting means in fixed relation to said respective first mentioned cams.

7. A cam supporting assembly comprising a tubular support having a flange extending therefrom, a driving pin projecting from said flange, a main cam surrounding said support and having an opening to receive said driving pin, a member received over said support to hold said main cam in place, an auxiliary cam received by said member and adjustable relative thereto so that it may be placed at some given position relative to said main cam, means acting jointly to hold said auxiliary cam fixed with respect to said member and to hold said member on said support, a rotatable shaft, and means to hold said assembly on said shaft and drive the same.

8. In a transmitting instrument, the combination of a plurality of actuating cams to actuate individual transmitting units, a plurality of concentric shafts, the end of the inner shaft extending beyond the end of the outer shaft, means to individually rotate each of said shafts, a support removably mounted on the end of each shaft, the support on the outer shaft being removable over the projecting end of the inner shaft when the support on said inner shaft has been removed, said actuating cams being mounted one on each support, said supports having the same outer diameter so that either cam may be mounted on either support, and means to hold said cams in non-rotatable relation on said supports.

9. In a transmitting instrument, a cam adapted to operate a transmitting unit, means to support and rotate said cam comprising a shaft, means to rotate said shaft. a support rotatably received on said shaft, a part non-rotatably received by said shaft, means to resiliently force a portion of said support into engagement with said part to provide a frictional drive between the two, said cam being received by said support, means to restrain said cam from rotating relative to said support, the arrangement being such that the cam is rotated by the support as the shaft rotates, but being rotatable relative to the shaft with said support by slipping of said friction drive.

10. A transmitting instrument including a cam operable to actuate a transmitting unit, means to support and rotate said cam comprising a shaft having a projecting end, means to rotate said shaft, a cam supporting unit mounted on said shaft, a portion of said unit being non-rotatable with respect to said shaft and a second portion of said unit being rotatable with respect thereto, means to maintain said two portions in frictional engagement with each other whereby said supporting unit is normally driven by said shaft but may be rotated relative thereto, said supporting unit being formed to receive said cam thereon, and means to rigidly fasten said cam upon said supporting unit.

EDWIN C. BURDICK.